United States Patent [19]

Würl

[11] Patent Number: 5,178,888
[45] Date of Patent: Jan. 12, 1993

[54] DEVICE FOR CLOSING MOLDS OF AN INJECTION MOLDING MACHINE

[75] Inventor: Ernst Würl, Höttingen, Fed. Rep. of Germany

[73] Assignee: Mannesmann Aktiengesellschaft, Dusseldorf, Fed. Rep. of Germany

[21] Appl. No.: 691,214

[22] Filed: Apr. 25, 1991

[30] Foreign Application Priority Data

May 7, 1990 [DE] Fed. Rep. of Germany ....... 4014905

[51] Int. Cl.$^5$ .............................................. B29C 45/66
[52] U.S. Cl. .................................. 425/589; 425/451.5; 425/451.6; 425/592; 425/593
[58] Field of Search ............... 425/589, 592, 593, 594, 425/451.5, 451.6

[56] References Cited

U.S. PATENT DOCUMENTS 4,088,432  5/1978  Farrell ................... 425/593
5,052,908  10/1991  Inaba et al. .............. 425/451.5

FOREIGN PATENT DOCUMENTS 164419  12/1985  European Pat. Off. .
2909738  9/1980  Fed. Rep. of Germany .
6309  3/1968  Japan .................. 425/451.6

Primary Examiner—Tim Heitbrink
Attorney, Agent, or Firm—Cohen, Pontani, Lieberman & Pavane

[57] ABSTRACT

A device for closing molds of an injection molding machine for plastic which includes a stationary end plate and a mold clamping plate displaceable on traverses. The stationary end plate is connected to the clamping plate by a toggle mechanism having a double toggle lever. The double toggle lever is actuatable by at least two drive units arranged between the end plate and the mold clamping plate, parallel to a main axis of the machine.

19 Claims, 4 Drawing Sheets

DEVICE FOR CLOSING MOLDS OF AN INJECTION MOLDING MACHINE

BACKGROUND OF THE INVENTION

The present invention relates to a device for closing molds of an injection molding machine for plastic and, more particularly, to such a mold closing device having a stationary end plate that is connected to a mold clamping plate which is moveable on traverses via a toggle lever mechanism having a double toggle lever.

During injection molding of plastic, mold halves are moved towards and away from each other during pauses in the cycle between casting and ejection of the cast article. For this purpose, a moveable mold clamping plate is displaced on traverses. This moveable clamping plate can be actuated directly by drive units or by a toggle mechanism.

An exclusively hydraulic embodiment has the disadvantage that, as a whole, one or more piston-cylinder units designed for relatively high pressures are necessary. In addition, the hydraulic pressure in this completely hydraulic machine must be retained when the machine is locked.

From EP-PS 01 64 419, a closing device for closing molds of an injection molding system is known in which a link mechanism is moveable by a spindle nut that is driven by a servo motor. Such embodiment has the disadvantage that the drive motor as well as the spindle nut protrude considerably in all embodiments described in the patent. The interference with the space between end plate and moveable clamping plate specifically upon a non-concentric arrangement is also disadvantageous.

From Federal Republic of Germany Patent 29 09 738 a form-locking device for injection molding machines for injection-compression molding of plastic parts is known in which a centrally arranged cylinder of a piston-cylinder unit has a stop at its end, the stop being adjustable in accordance with a compression stroke. The injection molding machine of the mentioned patent takes up a large amount of space due to the cylinder which extends out of the machine plus the adjusting device. By the central arrangement of the piston-cylinder unit, furthermore, the space between the end plate and the moveable mold clamping plate in the center is filled up.

SUMMARY OF THE INVENTION

An object of the present invention is to provide a mold closing unit which, with simple means, (i) reduces the required set-up space of an injection molding machine of this type and (ii) permits a substantially unimpeded installation space in the region of the side of the clamping plate facing the end plate.

The foregoing object of the invention is achieved by a device for closing molds of an injection molding machine for plastic. The device includes a stationary end plate and a mold clamping plate displaceable on traverses. The stationary end plate is connected to the clamping plate by a toggle mechanism having a double toggle lever. The double toggle lever is actuatable by at least two drive units arranged between the end plate and the mold clamping plate, parallel to a main axis of the machine.

At least two drive units are employed in the device of the invention for closing molds of an injection molding machine for plastic. By the use of double toggle levers, drives for a relatively low pressure level with small outside dimensions are used. By the provision of such drives between the end plate and the movable mold clamping plate, no drive parts extend beyond the main parts of the injection molding machine. Valuable shop space is not wasted; due to their protected arrangement, the drive parts are no longer as strongly endangered by damage due, for instance, to crane operations. By the elimination of impact and stumbling edges, safety on the job is increased.

By the provision of at least two drives, there is the possibility of keeping the region around the main axis of the machine free of disturbing machine parts. This free central space can be used for mounting, measuring and control purposes as well as for monitoring.

The construction of the injection molding machine of the invention is independent of the type of drive used. As a drive unit, hydraulic piston-cylinder units can be used, in the form of both differential and synchronous cylinders, as well as a ball screw. When synchronous cylinders are used, one can make use of the advantage that only a constant volume of oil is to be moved, both upon the closing phase and upon the opening phase. Servo-synchronous cylinders can advantageously be employed. Furthermore, the double toggle lever is guided by an attachment of the piston rod of the synchronous cylinder at both ends.

In another embodiment, the cylinder of the piston-cylinder unit is developed and guided as a travel surface. In a third embodiment, traverses are used as guide elements. Such types of guidance impart high rigidity to the compact injection molding machine.

The free space in the center of the injection molding machine is further increased by a crosshead developed in framework construction. This light construction of the crosshead, which is torsionally rigid when suitably designed, makes it possible, together with one of the above-indicated types of guidance, to effect a precise, disturbance-free introduction of the forces from the drives into the double toggle levers.

Without constricting the free space and without enlarging the outside dimensions of the injection molding machine, mechanical stops can be arranged at the foot of the drives. In this way, the toggle-lever system can be precisely adjusted. Furthermore, shock absorbers which minimize impact forces can also be provided on the stops. By these measures the life of individual parts of the injection molding machine is positively affected without limiting the ease of operation and maintenance resulting from the free space created.

BRIEF DESCRIPTION OF THE DRAWINGS

Embodiments of the machine of the invention are shown in the accompanying drawing, in which.

DETAILED DESCRIPTION OF THE PRESENTLY PREFERRED EMBODIMENT

Figure 1:
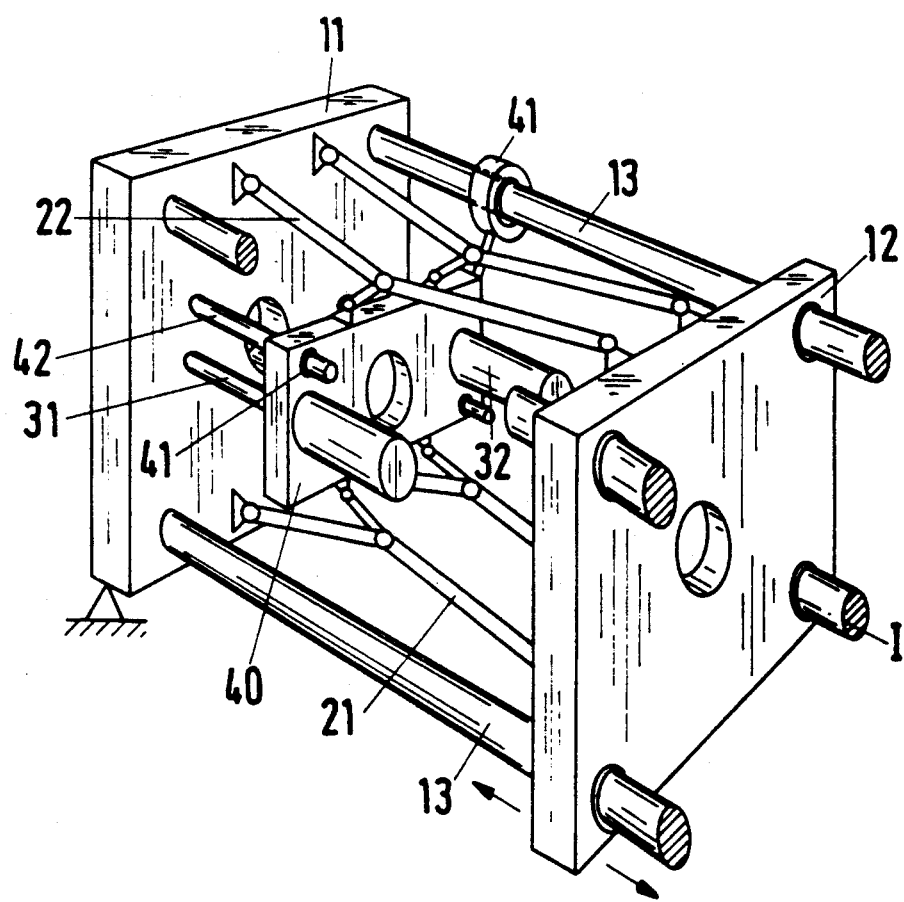
FIG. 1 is a diagrammatic view in perspective, showing a preferred construction of the invention.

FIG. 1 shows a stationary end plate 11 on which traverses 13, toggle levers 21, 22 and drives 31, 32 are fastened. The drives 31, 32 act in this connection on a crosshead 40 which, by means of toggle levers 21, 22, moves a mold clamping plate mounted on traverses 13. The crosshead 40 has guide bearings 41 which are guided either by the traverses 13 or on guide rods connected to the end plate 11.

Figure 2:
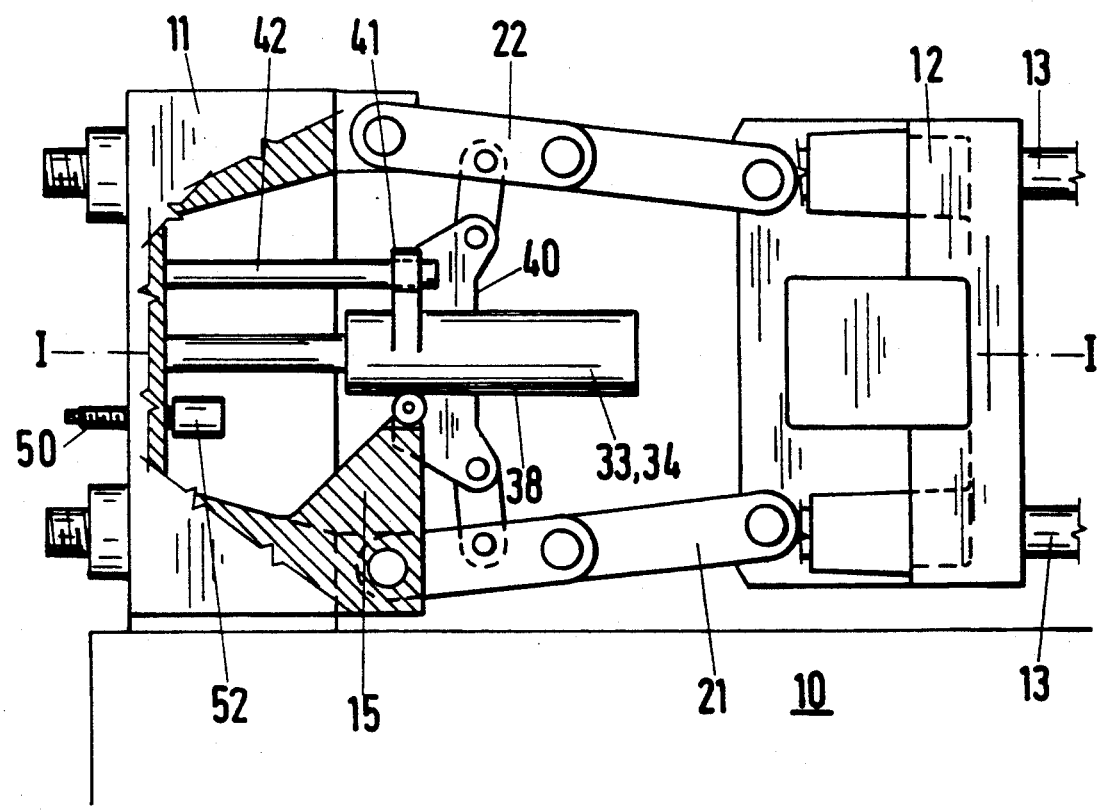
FIG. 2 is a side view of an injection molding machine in which the invention may be used.

FIG. 2 is a side view of an injection molding machine 10 with the end plate 11 and the mold clamping plate 12 guided on traverses 13. At the height of the main axis I of the machine, a piston-cylinder unit 33 is present as a drive. In FIG. 2, this piston-cylinder unit 33 is embodied as a differential cylinder 34. The toggle levers 21, 22 are articulated to the end plate 11, the mold clamping plate 12 and the crosshead 40.

In the upper region of FIG. 2, the crosshead 40 has a guide bearing 41 by which a guide rod 42 fastened to the end plate 11 is guided.

In the lower region of FIG. 2 there is provided on the cylinder of the differential cylinder 34 a travel surface 38 which is mounted on a guide unit 15 for laterally moving the piston-cylinder unit 33.

A mechanically adjustable stop provided with a shock absorber 52 is arranged on the end plate 11, parallel to the main axis I of the machine.

Figure 3:
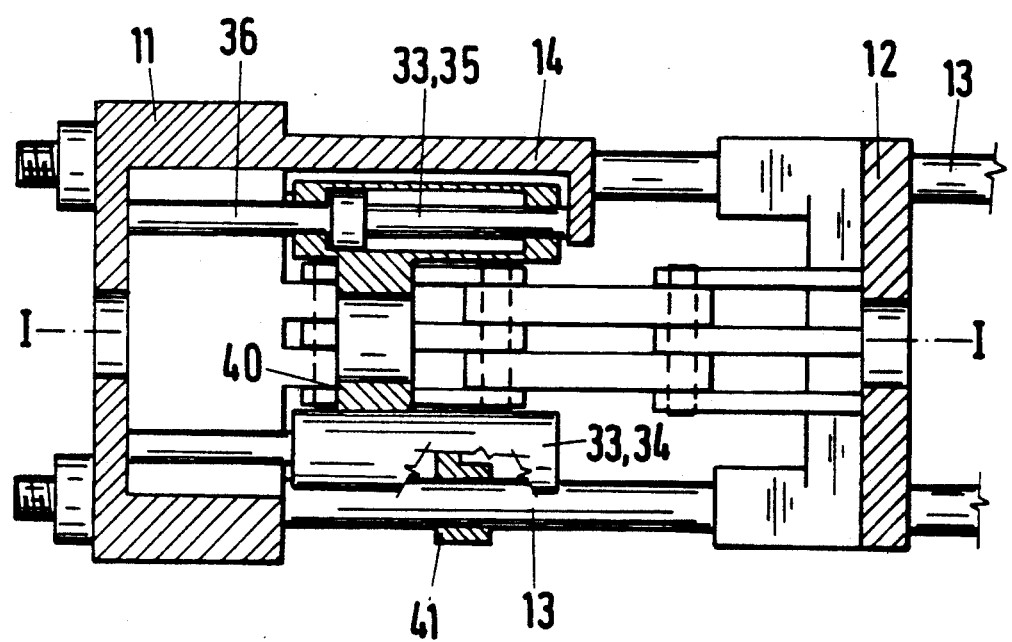
FIG. 3 is a horizontal section at the level of the center axis of the machine of FIG. 2, seen in a top view.

In the horizontal section of the top view shown in FIG. 3, a piston-cylinder unit 33 developed as a differential cylinder 34 is shown in the lower region in FIG. 2. The crosshead 40 has in this case a guide bearing 41 which is guided by traverses 13 connecting the end plate 11 and the mold clamping plate 12.

In the upper region of FIG. 3 the piston-cylinder unit 33 is developed as a synchronous cylinder 35. The piston rod 36 of the synchronous cylinder 35 is fastened at one end to the main body of the end plate 11 and at the other end to a housing part 14 of the end plate 11.

Figure 4:
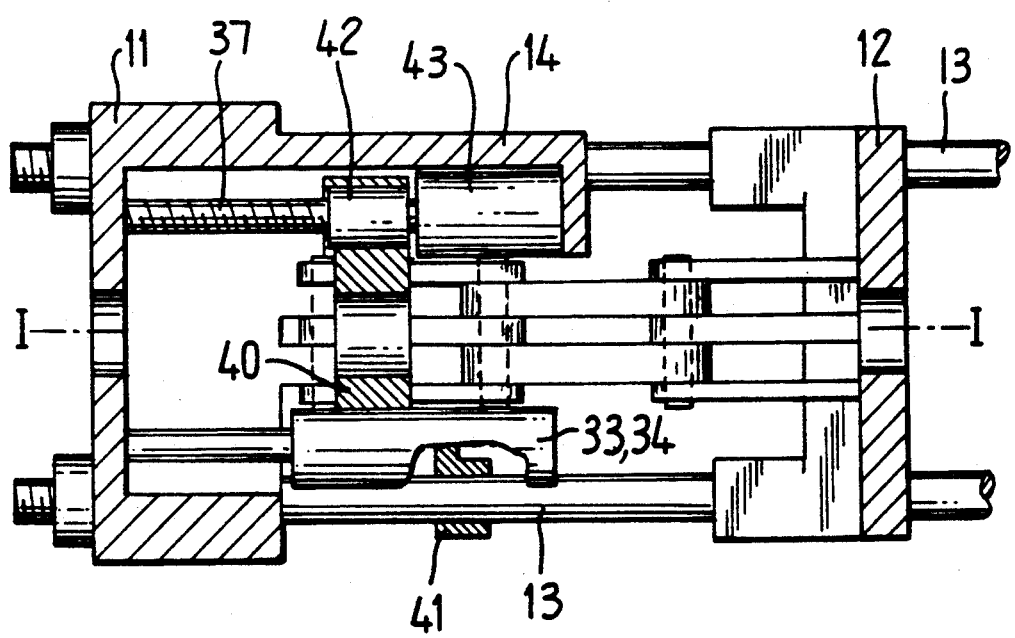
FIG. 4 is an alternative embodiment of a horizontal section at the level of the center axis of the machine of FIG. 2, seen in top view.

The upper portion of FIG. 4 shows an embodiment of the present invention employing a ball screw to drive the crosshead 40. The drive motor 43, is a motor provided between the end plate 11 and the movable mold clamping plate 12, so that no drive parts extend beyond the main parts of the molding machine. The drive motor 43 drives a ball screw 37 which is used in known manner in conjunction with an element 42 to move the crosshead 40.

It should be understood that the preferred embodiments and examples described are for illustrative purposes only and are not to be construed as limiting the scope of the present invention which is properly delineated only in the appended claims.

I claim:

1. A device for closing molds of an injection molding machine for plastic having a main axis, comprising:
   a stationary end plate;
   a mold clamping plate;
   a plurality of traverses mounted to said stationary end plate and extending toward said mold clamping plate, said mold clamping plate being displaceably guided along said traverses;
   a double toggle lever, having a central portion, a first end connected to said stationary end plate and a second end connected to said mold clamping plate;
   a crosshead; and
   at least two drive units, between said end plate and said mold clamping plate, connected to said crosshead and mounted at said end plate and having an axis of displacement parallel to the main axis of the machine, said drive units being linked in form locked manner via said crosshead to said central portion of said double toggle lever for lever movement of said central portion with respect to said end plate such that said mold clamping plate is displaced along said traverses.

2. The device according to claim 1, wherein said crosshead is linked to said double toggle lever by an articulated lever arm.

3. The device according to claim 1, wherein said crosshead comprises a torsionally rigid framework.

4. The device according to claim 3, further comprising a guide bearing arranged on said crosshead for guiding movement of crosshead parallel to the main axis of the machine.

5. The device according to claim 4, further comprising a guide bar fastened to said stationary end plate and extending toward said crosshead, wherein said guide bearing is displaceably mounted on said guide bar.

6. The device according to claim 4, wherein said guide bearing is displaceably mounted on said traverses.

7. The device according to claim 1, wherein said drive units comprise hydraulic piston-cylinder units.

8. The device according to claim 7, wherein said piston-cylinder units include differential cylinders.

9. The device according to claim 8, further comprising a cylinder of said piston-cylinder units and a travel surface provided on said cylinder of the piston-cylinder units.

10. The device according to claim 8, wherein said end plate includes a housing part comprising a guide for directing a movement of said travel surface.

11. The device according to claim 7, wherein said piston-cylinder units comprise synchronous cylinders.

12. The device according to claim 11, further a housing part of said stationary end plate and comprising piston rods of said synchronous cylinders, wherein said piston rods are fastened at both ends to said housing part.

13. The device according to claim 1, wherein said drive unit comprises a rotatably driven ball screw.

14. The device according to claim 1, further comprising a mechanical stop provided on said stationary end plate for limiting a range of displacement of said drive units.

15. The device according to claim 14, further comprising a shock absorber arranged on said stop for reducing impact forces.

16. The device according to claim 14, wherein said stop comprises an axially displaceable adjustment for adjusting a range of displacement of said drive units.

17. The device according to claim 4, wherein said guide bearing comprises a plurality of guide bearings, each arranged on said crosshead for guiding movement of crosshead parallel to the main axis of the machine.

18. The device according to claim 17, wherein said guide bar comprises a plurality guide bars fastened to said stationary end plate and extending toward said crosshead, wherein said guide bearings are displaceably mounted on said guide bars.

19. The device according to claim 17, wherein said guide bearings are displaceably mounted on at least two of said traverses.

* * * * *